United States Patent
Lee

(10) Patent No.: US 7,025,829 B2
(45) Date of Patent: Apr. 11, 2006

(54) EQUIPMENT FOR ALIGNING LIQUID CRYSTALS AND METHOD OF TRANSPORTING A PLURALITY OF SUBSTRATES THROUGH LIQUID CRYSTAL ALIGNING EQUIPMENT

(75) Inventor: Woo-Shik Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 10/881,938

(22) Filed: Jun. 30, 2004

(65) Prior Publication Data

US 2005/0007502 A1 Jan. 13, 2005

(30) Foreign Application Priority Data

Jul. 7, 2003 (KR) .................. 10-2003-0045780

(51) Int. Cl.
*B05C 11/02* (2006.01)
(52) U.S. Cl. .................. 118/106; 118/257; 118/76; 349/1; 349/126; 349/191
(58) Field of Classification Search .............. 118/106, 118/257, 76; 427/11, 58, 162, 163.1, 164, 427/165, 346, 355, 359, 365; 349/1, 126, 349/127, 129, 130, 132, 191
See application file for complete search history.

(56) References Cited

U.S. PATENT DOCUMENTS

2003/0179332 A1* 9/2003 Choi et al. .................. 349/123

* cited by examiner

*Primary Examiner*—Laura Edwards
(74) *Attorney, Agent, or Firm*—F. Chau & Associates, LLC

(57) ABSTRACT

Equipment for aligning liquid crystals is provided, comprising a first unit to form a first alignment layer and a second alignment layer on a first substrate group and a second substrate group, respectively; a second unit spaced apart from the first unit so as to receive the first and second substrate groups passed through the first unit; an alignment unit disposed between the first and second units, the alignment unit to provide a liquid crystal alignment part over the first alignment layer of the first substrate group while the first substrate group is transported through a first path from the first unit to the second unit; and a transportation unit disposed between the first and second units, the transportation unit to transport the second substrate group through a second path from the first unit to the second unit.

20 Claims, 11 Drawing Sheets

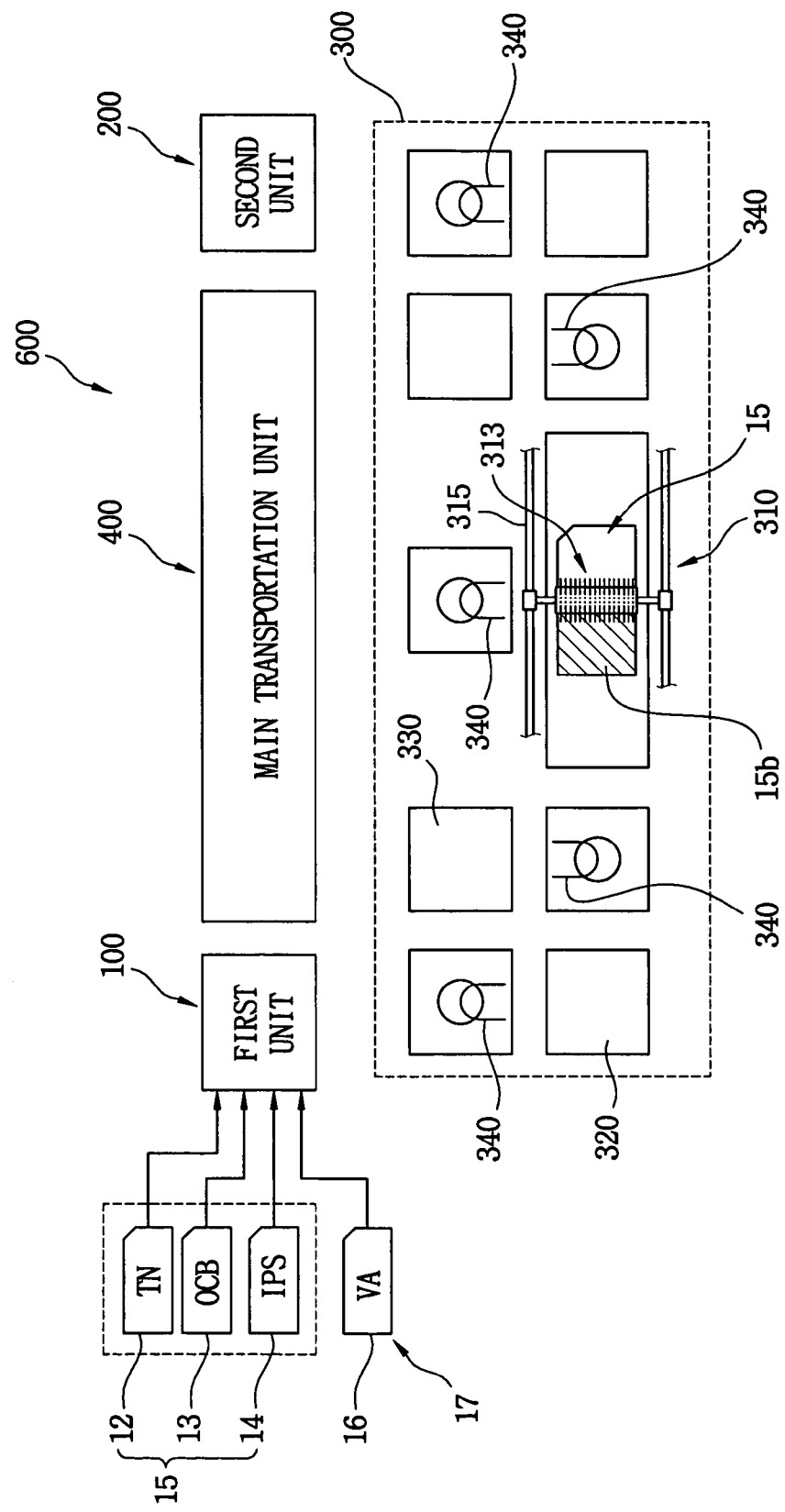

EQUIPMENT FOR ALIGNING LIQUID CRYSTALS AND METHOD OF TRANSPORTING A PLURALITY OF SUBSTRATES THROUGH LIQUID CRYSTAL ALIGNING EQUIPMENT

CROSS-REFERENCE TO RELATED APPLICATION

This application claims priority based on Korean Patent Application No. 2003-45780 filed on Jul. 7, 2003, the contents of which are herein incorporated by reference in its entirety.

BACKGROUND

1. Technical Field

The present disclosure relates to equipment for aligning liquid crystals (referred to as aligning equipment), and more particularly to aligning equipment that transports substrates along various routes.

2. Discussion of Related Art

In general, liquid crystal has electrical properties that cause changes in alignment of the liquid crystal when an electric field is applied, and optical properties that cause variations in light transmittance in accordance with the alignment of the liquid crystal. A liquid crystal display (LCD) device takes advantage of the electrical and optical properties of liquid crystal to display an image.

An LCD device is divided into a liquid crystal controlling part and a light providing part. The liquid crystal controlling part controls alignment of the liquid crystal to display an image, and the light providing part supplies light required to display an image to the liquid crystal controlling part.

The liquid crystal controlling part may have various structures depending on the type of liquid crystal. A twisted nematic (TN) mode LCD device using a TN mode liquid crystal, for example, includes a first substrate, the TN mode liquid crystal and a second substrate. The first substrate includes a first electrode, and a first alignment layer covering the first electrode. A first alignment groove extending in a first direction is formed on the first alignment layer. The second substrate includes a second electrode facing the first electrode, and a second alignment layer covering the second electrode. A second alignment groove extending in a second direction is formed on the second electrode.

LCD devices can also use a vertical alignment mode liquid crystal (VA mode LC). Examples of such devices include a vertical alignment (VA) mode LCD device and an in-plane switching (IPS) mode LCD device.

An optical controlled birefringence (OCB) mode LCD device includes a first substrate, an OCB mode liquid crystal and a second substrate. The first substrate includes a first electrode and a first alignment layer formed on the first electrode. The second substrate includes a second electrode facing the first electrode and a second alignment layer formed on the second electrode.

The OCB mode LCD device forms an alignment groove that extends in a direction substantially identical to that of the first and second alignment layers.

The IPS mode LCD device includes a first substrate, a VA mode LC and a second substrate. The first substrate includes a first electrode, a second electrode disposed on the first substrate and a first alignment layer covering the first and second electrodes. An alignment groove is formed on the first alignment layer. The second substrate faces the first substrate, and a second alignment layer is formed on the second substrate. The VA mode LC is interposed between the first and second substrates.

The VA mode LCD device includes a first substrate, a VA mode LC and a second substrate. The first substrate includes a first electrode and a first alignment layer formed on the first electrode. The second substrate includes a second electrode facing the first electrode and a second alignment layer formed on the second electrode. The VA mode LCD device includes a groove or protrusion on the first and second electrodes to align the VA mode LC. Thus, an alignment groove for aligning liquid crystal on the first and second alignment layers is not required in the VA mode LCD device.

Both first and second substrates of the TN mode LCD device, the OCB mode LCD device, the IPS mode LCD device and the VA mode LCD device as described above include an alignment layer. The first or second substrate of the TN mode LCD device, the OCB mode LCD device, the IPS mode LCD device and the VA mode LCD device is loaded in a consolidation state into aligning equipment so that an alignment layer can be formed on the first or second substrate.

Most conventional aligning equipment includes an alignment layer-forming device that forms an alignment layer and an alignment groove-forming device that forms an alignment groove. The alignment layer forming device and the alignment groove-forming device are disposed in an in-line manner, so that the aligning equipment may successively perform processes for forming the alignment layer and for forming the alignment groove on the alignment layer. After the alignment layer-forming device forms an alignment layer on the first and second substrates, the LCD device is transported to the alignment groove-forming device where the alignment groove is formed on the alignment layer.

An alignment groove is not formed on the alignment layer of a VA mode LCD device. Hence, the first and second substrates of the VA mode LCD device directly pass through the alignment groove forming device or an auto guide vehicle (AGV), and then are transported to a subsequent process.

When the first and second substrates of the VA mode LCD device pass through the alignment groove forming device, the first and second substrates also pass through various kinds of units disposed within the alignment groove forming device, such as, for example, a cleaning unit, an alignment unit, a rubbing unit, a rinsing unit, etc., in sequence. Thus, the alignment groove forming process for the TN LCD device, the OCB mode LCD device and the IPS mode LCD device may be delayed while the VA mode LCD device passes through the units.

Additionally, when the first and second substrates are transported by a separate AGV, the total area of the aligning equipment increases due to the space occupied by the AGV. Further, installation and control of the AGV is expensive.

When the AGV transports the VA mode LCD device using a transporting cassette, the AGV needs to be on standby until the transporting cassette is filled with the VA mode LCD devices. Thus, the VA mode LCD device is exposed to the atmosphere for a long period while the transporting cassette is loaded. Consequently, various particles such as dust may attach to the alignment layer of the VA mode LCD device, thereby requiring rinsing of the VA mode LCD device before proceeding with the next process.

Each of the TN mode LCD device, the OCB mode LCD device, the IPS mode LCD device and the VA mode LCD device should have its own alignment layer forming device. However, this would require relatively expensive aligning equipment that occupies a large area.

SUMMARY OF THE INVENTION

An equipment is provided for aligning liquid crystals, comprising a first unit to form a first alignment layer and a second alignment layer on a first substrate group and a second substrate group, respectively; a second unit spaced apart from the first unit so as to receive the first and second substrate groups passed through the first unit; an alignment unit disposed between the first and second units, the alignment unit to provide a liquid crystal alignment part over the first alignment layer of the first substrate group while the first substrate group is transported through a first path from the first unit to the second unit; and a transportation unit disposed between the first and second units, the transportation unit to transport the second substrate group through a second path from the first unit to the second unit.

The transportation unit further comprises a guide rail to connect the first unit to the second unit; and a transportation robot mounted on the guide rail so as to transport the first substrate group, wherein the transportation unit can be a conveyor unit disposed between the first and second units, and preferably further comprises a first robot arm to transport the first substrate group to the conveyor unit from the first unit; and a second robot arm to transport the first substrate group to the second unit from the conveyor unit.

Preferably, one or both of the first path and the second path is a straight-line path and one path is longer than the other path.

The alignment unit comprises a liquid crystal alignment module to provide the liquid crystal alignment part over the first alignment layer. The liquid crystal alignment module further comprises a rubbing roller to which a rubbing cloth having a pile is attached; and a rubbing roller transporting device to transport the rubbing roller, wherein the alignment unit further comprises a cleaning module to clean the first substrate group, and an aligning unit to adjust a direction of the liquid crystal alignment part.

According to an embodiment of the present invention, an equipment is provided for aligning liquid crystals, comprising a first unit to form a first alignment layer and a second alignment layer on a first substrate group and a second substrate group, respectively a first receiving unit to receive the first and second substrate groups a second receiving unit spaced apart from the first receiving unit so as to receive the first and second substrate groups; a transportation unit to transport the first substrate group through a first path from the first receiving unit to the second receiving unit; and a liquid crystal alignment unit to transport the second substrate group along a second path and to provide a liquid crystal alignment part over the second alignment layer.

The transportation unit comprises a guide rail to connect the first receiving unit to the second unit; and a transportation robot mounted on the guide rail to transport the first substrate group, wherein the transportation unit further comprises a conveyor unit disposed between the first and second receiving units, a first robot arm to transport the first substrate group to the conveyor unit from the first unit; and a second robot arm to transport the first substrate group to the second unit from the conveyor unit.

Preferably, the first receiving unit further comprises a first gate through which the first substrate group is loaded; a second gate through which the first substrate group is unloaded to the transportation unit; and a third gate through which the second substrate group is unloaded to the liquid crystal alignment unit; a fourth gate through which the first substrate group from the transportation unit is loaded; a fifth gate through which the second substrate group from the liquid crystal alignment unit is loaded; and a sixth gate through which the first and second substrate groups are unloaded.

The liquid crystal alignment unit further comprises a first cleaning module to initially clean the second substrate group a liquid crystal alignment module to provide the liquid crystal alignment part over the second alignment layer; and a second cleaning module to clean the second substrate group over which the liquid crystal alignment part is provided.

BRIEF DESCRIPTION OF THE DRAWINGS

The above and other features of the present invention will become more apparent by describing in detail exemplary embodiments thereof with reference to the attached drawings in which:

FIG. 3 is a schematic view showing a liquid crystal alignment unit of FIG. 1;

DESCRIPTION OF PREFERRED EMBODIMENTS

Figure 1:
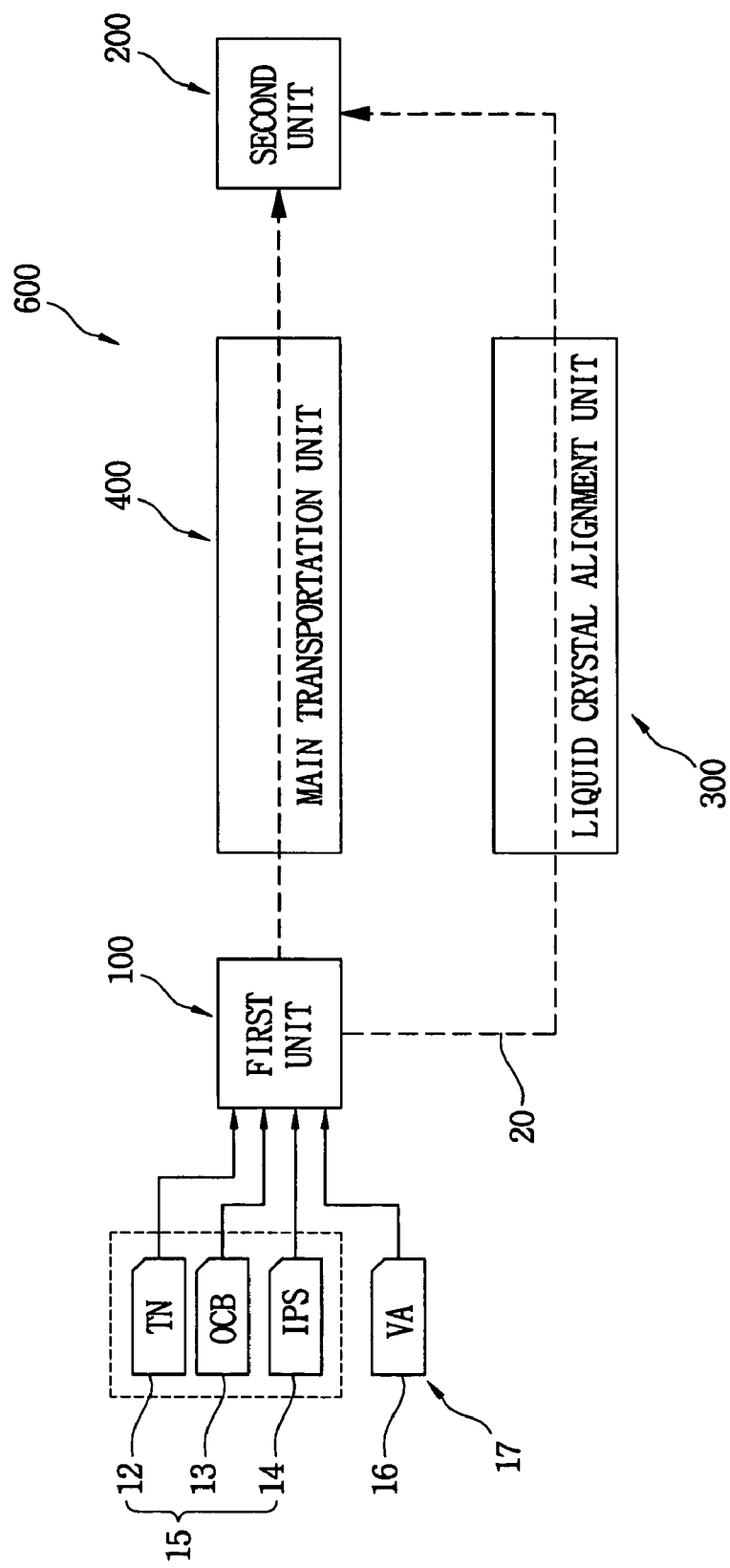
FIG. 1 is a schematic block diagram showing equipment for aligning liquid crystal according to an exemplary embodiment of the present invention.
Figure 2A:
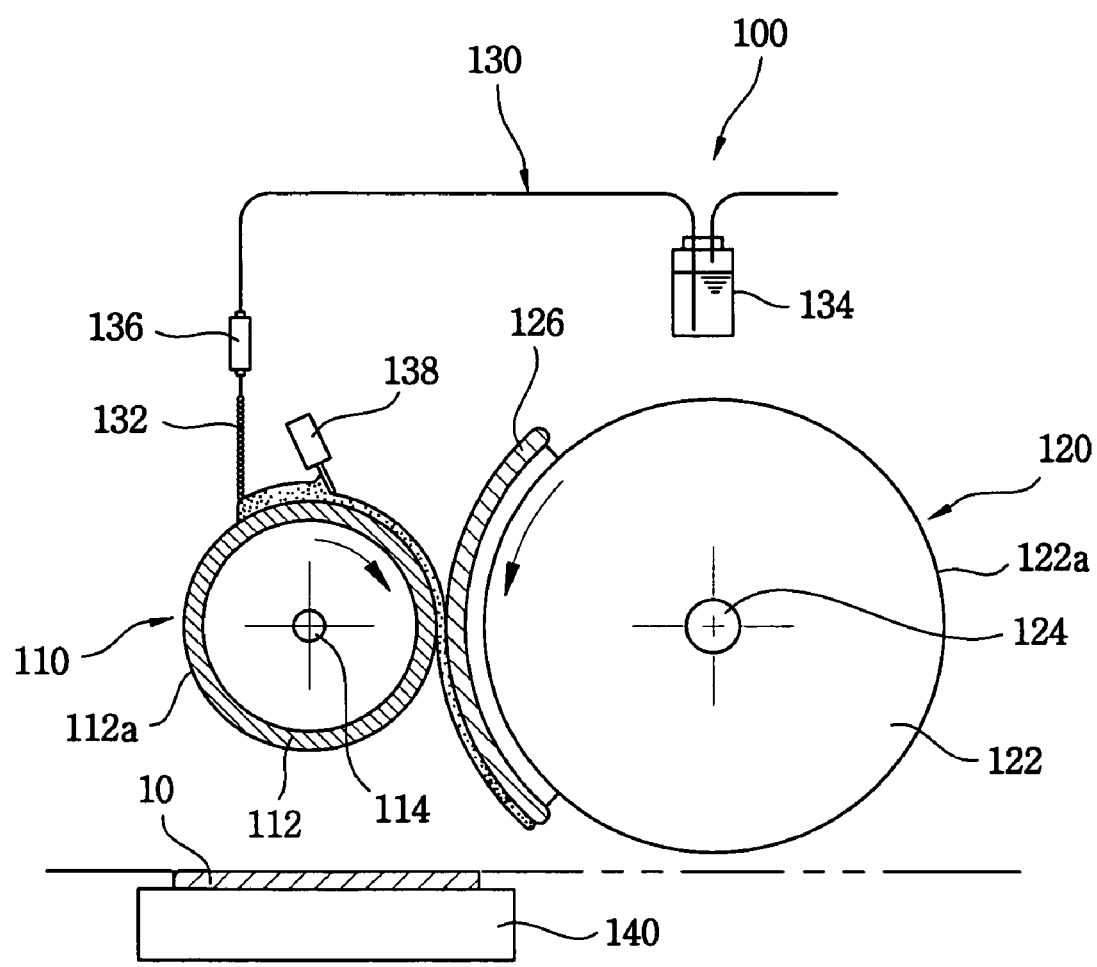
FIG. 2A is a schematic view showing a first unit of FIG. 1.
Figure 2B:
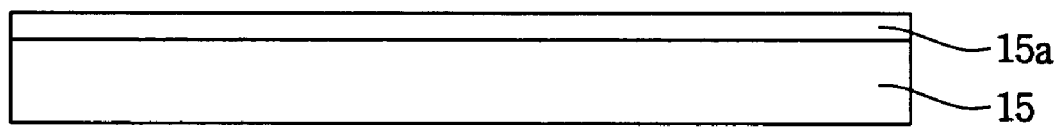
FIG. 2B is a schematic view showing an alignment layer formed on a first substrate.
Figure 2C:
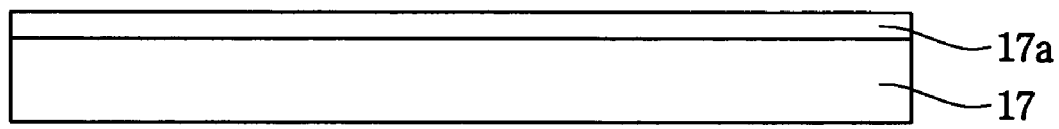
FIG. 2C is a schematic view showing an alignment layer formed on a second substrate.

FIG. 1 is a schematic block diagram showing equipment for aligning liquid crystal according to an embodiment of the present invention. FIG. 2A is a schematic view showing a first unit of FIG. 1. FIG. 2B is a schematic view showing an alignment layer formed on a first substrate. FIG. 2C is a schematic view showing an alignment layer formed on a second substrate.

Referring to FIGS. 1 to 2C, equipment for aligning liquid crystal (hereinafter, referred to as aligning equipment) 600 includes a first unit 100, a second unit 200, a liquid crystal alignment unit 300 and a main transportation unit 400.

The first unit 100 forms an alignment layer on a substrate 10. With reference to FIG. 2, the first unit 100 includes a first roller unit 110, a second roller unit 120, an alignment material providing unit 130 and a sub transportation unit 140.

The first roller unit 110 includes a first roller 112 and a first rotation unit 114. The first roller 112 has a cylinder shape having a first diameter, and the first rotation unit 114 rotates the first roller 112 in a clockwise direction.

The second roller 120 includes a second roller 122, a second rotation unit 124 and a transport plate 126. The second roller 122 has a cylinder shape having a second diameter greater than the first diameter, and the second rotation unit 124 rotates the second roller 122 in a counter-clockwise direction. The transport plate 126 is installed on a surface of the second roller 122. The transport plate 126 has a curved surface shape having substantially the same radius of curvature as that of the second roller 122, and an area that completely covers the substrate 10.

A first outer circumference surface 112a of the first roller 112 and a second outer circumference surface 122a of the second roller 122 are disposed substantially parallel to each other, and are spaced apart from each other by a predetermined distance. The predetermined distance between the first and second outer circumference surfaces 112a and 122a is substantially the same as a thickness of the alignment layer formed on the substrate 10.

The alignment material providing unit 130 supplies an alignment material to the first outer circumference surface 112a of the first roller 112. The alignment material providing unit 130 includes an alignment material storage tank 134 and an alignment material dispenser 136.

To form the alignment layer on the substrate 10, the sub transportation device 140 transports the substrate 10 in an engagement direction such that the substrate 10 is engaged with the transport plate 126, which rotates in the counter-clockwise direction.

An alignment material 132 discharged from the alignment material storage tank 134 of the alignment material providing unit 130 is provided to the first outer circumference surface 112a of the first roller 112 through the alignment material dispenser 136. After the thickness of the alignment material coated on the first outer circumference surface 112a of the first roller 112 is adjusted by an alignment material thickness adjusting unit 138, the alignment material is transported to the transport plate 126 mounted on the second roller 122. Then, the transported alignment material is transported to the substrate 10, thereby forming the alignment layer on the substrate 10.

Referring to FIG. 1, the substrate 10 is one of various types of substrates such as, for example, a TN mode substrate 12 of a TN mode LCD device, an OGB mode substrate 13, an IPS mode substrate 14 of an IPS mode LCD device or a VA mode substrate 16 of a VA mode LCD device, provided at the first unit 100. The TN mode substrate 12, the OCB mode substrate 13, the IPS mode substrate 14 and the VA mode substrate 16 commonly have the alignment layer formed thereon by the first unit 100. Among the above substrates, the TN mode substrate 12, the OCB mode substrate 13 and the IPS mode substrate 14 have a liquid crystal alignment part to align the liquid crystal on the alignment layer, and the VA mode substrate 16 does not have the liquid crystal alignment part.

For ease of explanation of this exemplary embodiment, the TN mode substrate 12, the OCB mode substrate 13, the IPS mode substrate 14 are referred to as a first substrate 15, and the VA mode substrate 16 is referred to as a second substrate 17. In FIG. 2B, the first unit 100 forms a first alignment layer 15a and a second alignment layer 17a on surfaces of the first substrate 15 and the second substrate 17, respectively.

In this exemplary embodiment, the first and second alignment layers 15a and 17a are formed on the surfaces of the first and second substrates 15 and 17, respectively. However, in embodiments of the invention, a diamond-like-carbon film (DLC film) may be formed on the surface of the first substrate 15. The DLC film formed on the surface of the first substrate 15 is used for aligning the liquid crystal in a non-contact method.

The second unit 200 is spaced apart by a predetermined distance from the first unit 100. The second unit 200 is a substrate cassette that receives the first substrate 15 and the second substrate 17. The second unit 200 may be a rinsing device that rinses the first substrate 15 or the second substrate 15 and 17 before proceeding with a subsequent process.

As shown in FIG. 1, the liquid crystal alignment unit 300 receives the first substrate 15 on which the first alignment layer 15a is formed by the first unit 100 through a first route 20 and forms a liquid crystal alignment part on the first alignment layer 15a.

Figure 4:
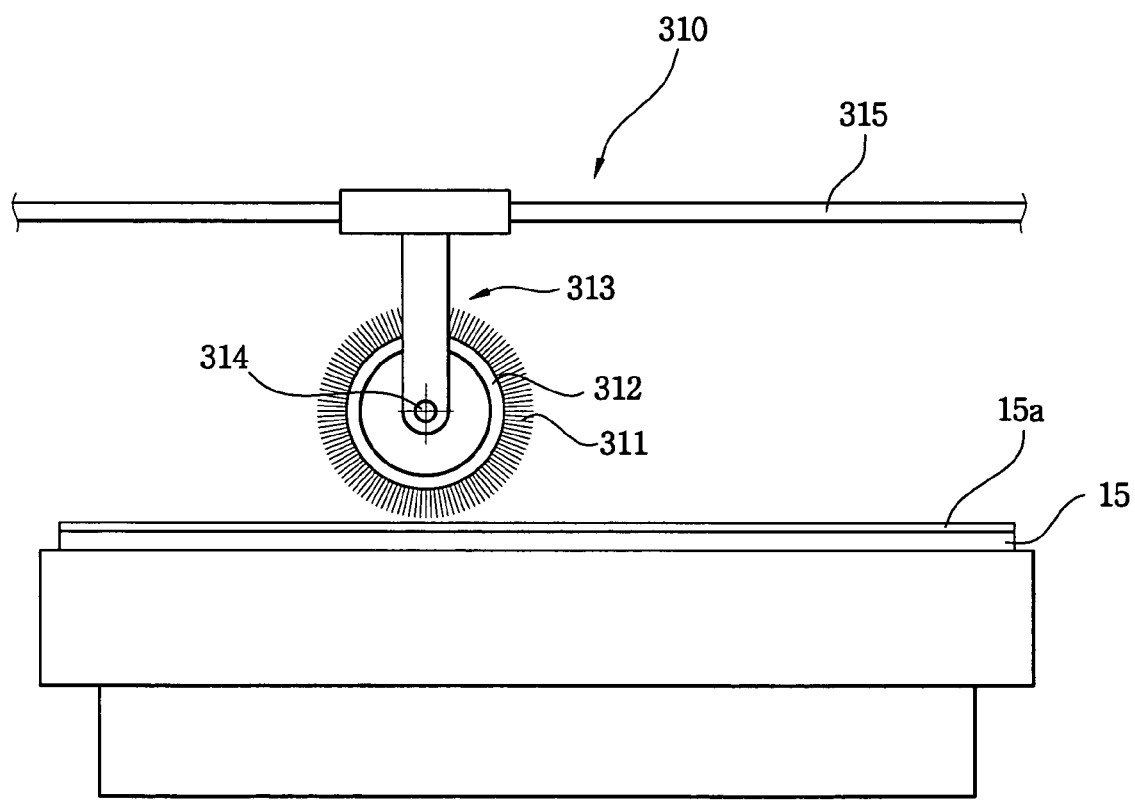
FIG. 4 is a schematic view showing a liquid crystal alignment module of FIG. 3.

FIG. 3 is a schematic view showing a liquid crystal alignment unit of FIG. 1, and FIG. 4 is a schematic view showing a liquid crystal alignment module of FIG. 3.

Referring to FIGS. 3 and 4, the liquid crystal alignment unit 300 includes a liquid crystal alignment module 310. The liquid crystal alignment module 310 forms a liquid crystal alignment part 15b on the first alignment layer 15a that is formed on the first substrate 15. The liquid crystal alignment module 310 acts as a rubbing module that forms the first liquid crystal alignment part 15b on the surface of the first alignment layer 15a. Hereinafter, the liquid crystal alignment module 310 will be referred to as a rubbing module 310. The rubbing module 310 includes a rubbing roller 313 on which a rubbing fabric 312 is attached and a pile 311 is implanted, a rubbing roller rotation unit 314 that rotates the rubbing roller 313 in a clockwise direction or a counter-clockwise direction, and a rubbing roller transporting device 315 that moves the rubbing roller 313 relative to the first substrate 15.

The liquid crystal alignment unit 300 may further include at least one substrate rinsing unit 320 and a substrate alignment unit 330. The substrate rinsing unit 320 cleans particles on the surface of the first alignment layer 15a before the first substrate 15 on which the first alignment layer 15a is formed is transported to the liquid crystal alignment module 310. In this embodiment, the substrate rinsing unit 320 rinses the particles on the surface of the first alignment layer 15a of the first substrate 15 using supersonic waves. However, in other embodiments of the invention, the substrate-rinsing unit can be any suitable dry rinsing device. The substrate-rinsing unit 320 may be disposed at both sides of the liquid crystal alignment module 310. The substrate rinsing unit 320 may perform a first rinsing process with respect to the first substrate 15 before the first substrate 15 is provided to the liquid crystal alignment module 310, and a second rinsing process with respect to the first substrate 15 on which the liquid crystal alignment part 15b is formed by the liquid crystal alignment module 310.

In other exemplary embodiments of the invention in which the non-contact method is used, the liquid crystal alignment unit 300 may form a liquid crystal alignment part on the surface of the first substrate 15 using an ion beam or an atomic beam. Thus, the first unit 100 forms the DLC film on the first substrate 15.

The liquid crystal alignment unit 300 may further include the substrate alignment unit 330 in addition to the liquid crystal alignment module 310 and the substrate-rinsing device 320. The substrate alignment unit 330 changes a direction of the liquid crystal alignment part 15b. The substrate alignment unit 330 rotates the liquid crystal alignment part 15b on a plane in accordance with the type of first substrate 15. That is, when the first substrate 15 is an IPS mode substrate 14, the IPS mode substrate 14 may be rotated by about 15° from a baseline by the substrate alignment unit 330. When the first substrate 15 is the TN mode substrate 12, the TN mode substrate 12 may be rotated by about 45° from the baseline by the substrate alignment unit 330. The substrate alignment unit 330 aligns the first substrate 15 accurately at a predetermined position, thereby preventing a misalignment of the liquid crystal. In FIG. 4, reference numeral "340" indicates a robot arm.

Figure 5:
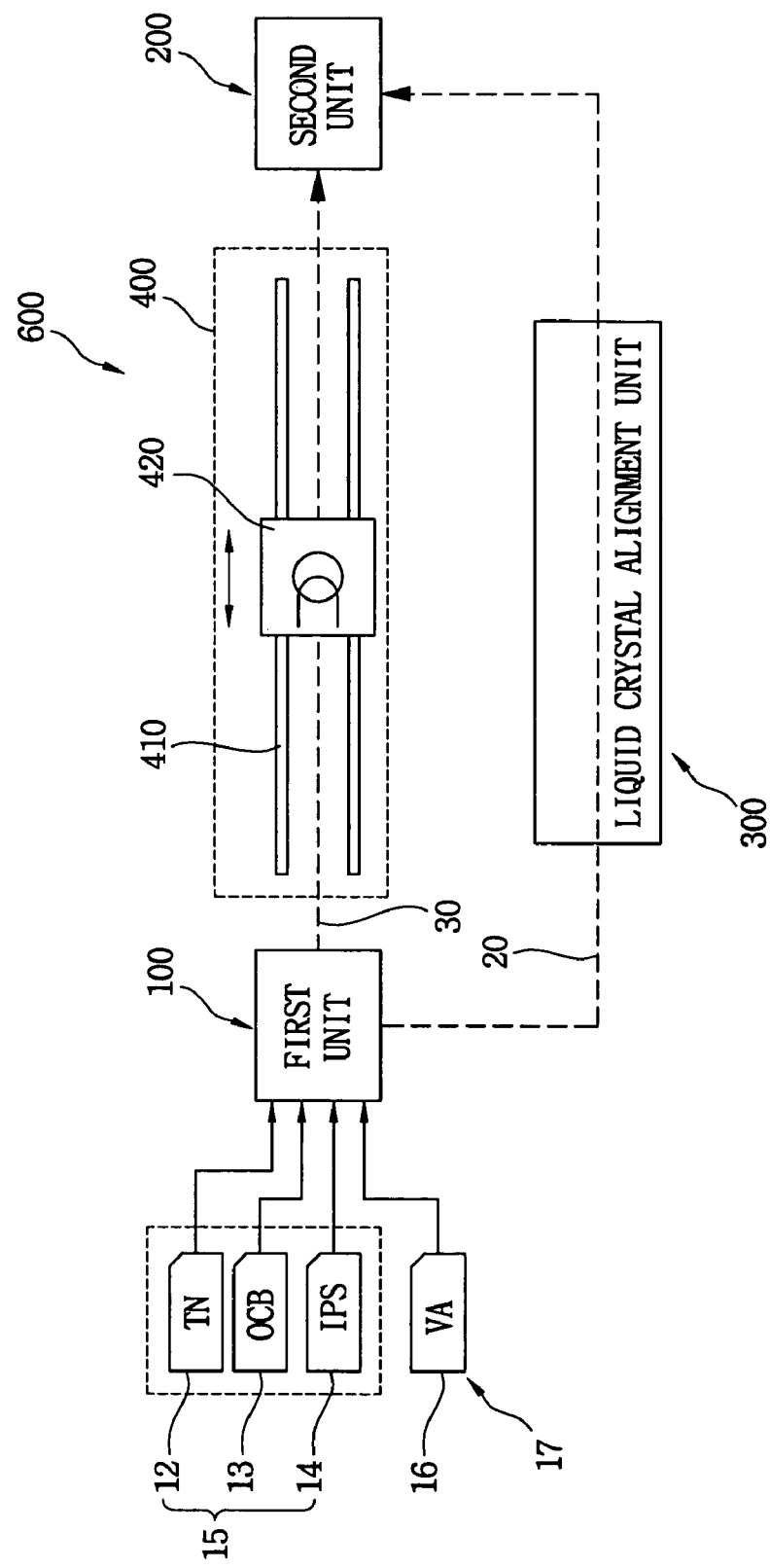
FIG. 5 is a schematic view showing a main transportation unit of FIG. 1.

FIG. 5 is a schematic view showing a main transportation unit of FIG. 1.

Referring to FIG. 2B or 5, the main transportation unit 400 transports the second substrate 17 on which the second alignment layer 17a is formed to the second unit 200 through a second route 30. The second route 30 is a straight-line route, and is shorter than the first route 20. The second route 30, for example, connects the first and second units 100 and 200 with a straight line, and the first route 20 connects the first and second units 100 and 200 with a curved line.

Therefore, the main transportation unit 400 is interposed between the first and second units 100 and 200. The main transportation unit 400 transports the second substrate 17 from the first unit 100 to the second unit 200 through the second route 30 that does not pass through the liquid crystal alignment unit 300.

The main transportation unit 400 includes a guide rail 410 and a transportation robot 420 to decrease time for transporting the second substrate 17 from the first unit 100 to the second unit 200.

The guide rail 410 is interposed between the first and second units 100 and 200. The guide rail 410 may be disposed as in a single line method or a multiple line method. In this exemplary embodiment, the guide rail 410 is disposed as in the multiple line method, and a portion of the guide rail 410 may be formed in a curved line.

The transportation robot 420 transports the second substrate 17 between the first and second units 100 and 200 along the guide rail 410. That is, the transportation robot 420 may transport the second substrate 17 from the first unit 100 to the second unit 200, and transport the second substrate 17 from the second unit 200 to the first unit 100. The transportation robot 420 transports a single second substrate 17 from the first unit 100 to the second unit 200. However, the transportation robot 420 may also transport a plurality of the second substrates 17 at once. The transportation robot 420 transports the second substrate 17 at a speed of about 500 mm/s, which is much faster than that of an AGV.

The second substrate 17 is not transported together with the first substrate 15 to prevent interference between the first and second substrates 15 and 17, thereby decreasing transporting time for the first and second substrates 15 and 17.

For example, the time for transporting the second substrate 17 in the same route as that of the first substrate 15 and the time for transporting the second substrate 17 in a different route than that of the first substrate 15 are compared below.

When the liquid crystal alignment part is formed while transporting the first substrate 15 through the first route 20, the time for passing the substrate rinsing unit 320, the alignment unit 330 and the liquid crystal alignment module 310 is greater than or equal to at least about 300 seconds when the transporting speed of the first substrate 15 is about 50 mm/s, and the length of the equipment is about 17 m. When the second substrate 17 is transported through the first route 20 to the second unit 200 under the same conditions as above, and the time for the substrate rinsing, the substrate alignment and forming the liquid crystal alignment part is not considered, the time for transporting the second substrate 17 from the first unit 100 to the second unit 200 is from about 250 seconds to about 290 seconds. When the transporting speed for the second substrate 17 is increased to about 100 mm/s, the time for the second substrate 17 to pass from the first unit 100 to the second unit 200 through the substrate rinsing unit 320, the alignment unit 330 and the liquid crystal aligning module 310 is from about 145 seconds to about 150 seconds.

The time for the second substrate 17 to be transported about 17 m from the first unit 100 along the second route 20 to the second unit 200 by an AGV is about 400 seconds. Since the AGV moves from the first unit 100 to the second unit 200 after the substrate cassette is filled with the second substrate 17, transporting the second substrate 17 from the first unit 100 to the second unit 200 takes at least about 500 seconds.

When the second substrate 17 outputted from the first unit 100 is transported through the second route 20 to the second unit 200 using the main transportation unit 400, the main transportation unit 400 having a speed of about 500 mm/s transports the second substrate 17 for about 17 m in about 34 seconds.

Therefore, using the main transportation unit 400 for transporting the second substrate 17 may advantageously decrease transporting time to about ¼ to about 1/15 of the transporting time when an AGV is used.

An area in which the aligning equipment occupies is also decreased when transporting the second substrate 17 using the main transportation unit 400.

Accordingly, transporting substrates through different routes according to the type of substrates may decrease the transporting time, and the area occupied by the equipment.

Figure 6:
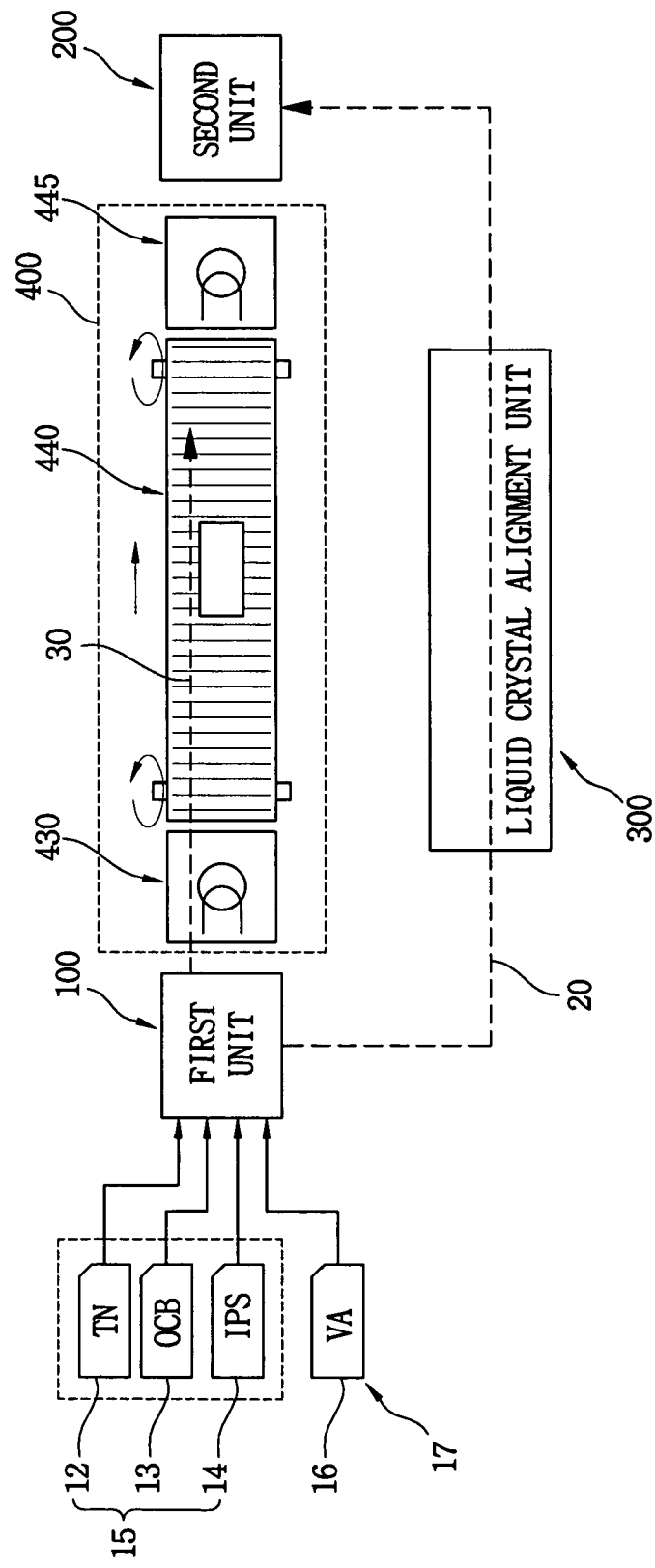
FIG. 6 is a schematic view showing equipment for aligning liquid crystal according to another exemplary embodiment of the present invention.

FIG. 6 is a schematic view showing aligning equipment according to another exemplary embodiment of the present invention. In the present exemplary embodiment, the same reference numerals denote the same elements in the previous exemplary embodiment, and thus the detailed descriptions of the same elements will be omitted.

Referring to FIG. 6, a main transportation unit 400 includes a first robot arm 430, a second robot arm 445 and a conveyer transportation unit 440.

The conveyer transportation unit 440 is disposed between a first unit 100 and a second unit 200. The conveyer transportation unit 440 transports a second substrate 17 from the first unit 100 to the second unit 200, or from the second unit 200 to the first unit 100. A method of transporting the second substrate 17 from the first unit 100 to the second unit 200 using the conveyer transportation unit 440 according to the present exemplary embodiment of the invention will be described.

The first robot arm 430 is installed between the conveyer transportation unit 440 and the first unit 100, and transports the second substrate 17 from the first unit 100 to the conveyer transportation unit 440.

The second robot arm 445 is installed between the conveyer transportation unit 440 and the second unit 200, and transports the second substrate 17 from the conveyer transportation unit 440 to the second unit 200.

Since the conveyer transportation unit 440 may successively transport the second substrate 17 in one direction from the first unit 100 to the second unit 200, the time for transporting the second substrate 17 may be further decreased compared to the transporting time for other transportation devices, such as the AGV or the guide rail. The conveyer transportation unit 440 may safely transport the second substrate 17 even when the second substrate 17 has a relatively large surface area.

The conveyer transportation unit 440 is used to transport a substrate so as to decrease the time for moving much larger substrates and to reduce damage on the substrate during transportation.

Figure 7:
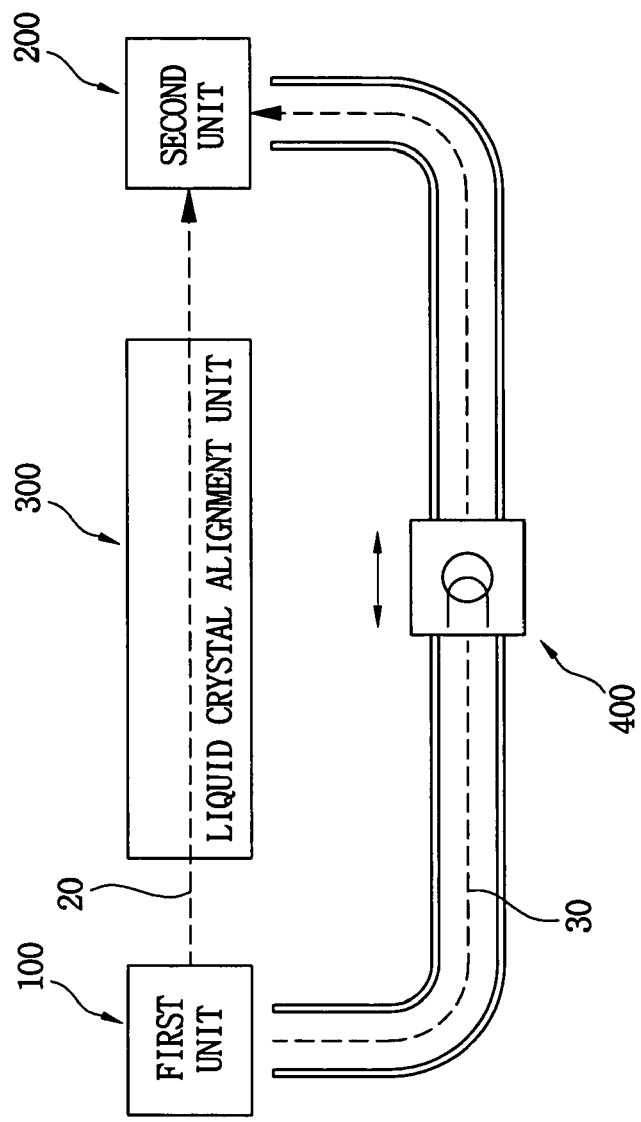
FIG. 7 is a schematic view showing equipment for aligning liquid crystal according to another exemplary embodiment of the present invention.

FIG. 7 is a schematic view showing aligning equipment according to another exemplary embodiment of the present invention. In the present exemplary embodiment, the same reference numerals denote the same elements in the previous exemplary embodiments, and thus the detailed descriptions of the same elements will be omitted.

Referring to FIG. 7, a liquid crystal alignment unit 300 is disposed between a first unit 100 and a second unit 200, and a main transportation unit 400 is disposed substantially parallel with the liquid crystal alignment unit 300.

A first substrate 15 outputted from the first unit 100 is transported to the second unit 200 by a first route 20 passing through the liquid crystal alignment unit 300. The first route 20 is a straight-line route.

A second substrate 17 outputted from the first unit 100 is transported through a second route 30 to the second unit 200 by the main transportation unit 400. The length of the second route 30 is longer than that of the first route 20.

The first route 20 of the first substrate 15 passing through the liquid crystal alignment unit 300 is shortened relative to the second route 30 of the second substrate 17 transporting a substrate by the main transportation unit 400 based on whether there is a large discrepancy between the number of first substrates 15 and the number of second substrates 17.

For example, when the number of first substrates 15 outputted from the first unit 100 is much smaller than the number of second substrates 17 outputted from the first unit 100, the first route 20 of the first substrate 15 is shortened relative to the second route 30 of the second substrate 17 so as to shorten the transporting time of the first substrate 15.

Whereas, when the number of first substrates 15 outputted from the first unit 100 is much larger than the number of second substrates 17 outputted from the first unit 100, the first route 20 of the first substrate 15 is shortened relative to the second route 30 of the second substrate 17, and the second substrate 17 is transported by the main transportation unit 400, thereby shortening the transporting time of the first and second substrates 15 and 17.

Figure 8:
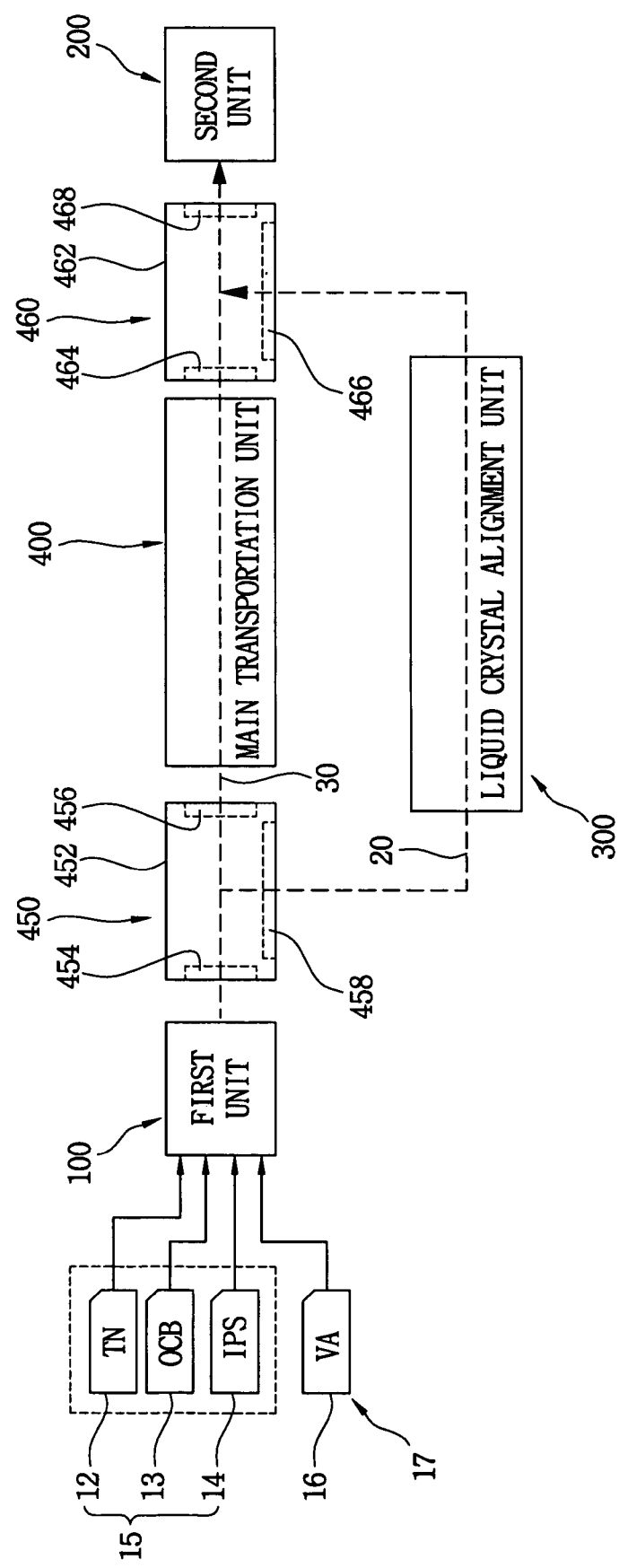
FIG. 8 is a schematic view showing equipment for aligning liquid crystal according to another exemplary embodiment of the present invention.

FIG. 8 is a schematic view showing aligning equipment according to another exemplary embodiment of the present invention. In the present exemplary embodiment, the same reference numerals denote the same elements in the previous exemplary embodiments, and thus the detailed descriptions of the same elements will be omitted.

Referring to FIG. 8, a first receiving unit 450 and a second receiving unit 460 are disposed between a first unit 100 and a second unit 200. A main transportation unit 400 is disposed between the first and second receiving units 450 and 460.

The first receiving unit 450 acts as a buffer cassette that temporarily piles up the first and second substrates 15 and 17 provided from the first unit 100. The first receiving unit 450 is advantageously employed when the number of first and second substrates 15 and 17 outputted from the first unit 100 is substantially greater than the number that the main transportation unit 400 and the liquid crystal alignment unit 300 may handle. The first and second substrates 15 and 17 that may not be transported by the main transportation unit 400 and the liquid crystal alignment 300 are held on standby in a pile in the first receiving unit 450.

The first receiving unit 450 has a space sufficient for receiving the first and second substrates 15 and 17, and includes a first receiving body 452, a first gate 454, a second gate 456 and a third gate 458.

The first receiving body 452 includes a plurality of slots (not shown) so as to pile a plurality of the first and second substrates 15 and 17.

The first gate 454 is formed in the first receiving body 452, and faces the first unit 100 so as to receive the first and second substrates 15 and 17 outputted from the first unit 100 in the slots. The second gate 456 is disposed facing the main transportation unit 400 so as to unload the second substrate 17 to the second unit 200 through the main transportation unit 400. The third gate 458 is disposed facing the liquid crystal alignment unit 300 so as to unload the first substrate 15 to the liquid crystal alignment unit 300.

The second receiving unit 460 also acts as a buffer cassette that temporarily stores the first substrate 15 transported through the liquid crystal alignment unit 300 and the second substrate 17 transported through the main transportation unit 400 in a pile. The second receiving unit 460 is advantageously used when the number of first and second substrates 15 and 17 exceeds the capacity of the second unit 200. Therefore, the first and second substrates 15 and 17 are stored in a pile in the second receiving unit 460 before being passed through the second unit 200.

The second receiving unit 460 has a space sufficient for holding the first and second substrates 15 and 17, and acts as a substrate cassette. The second receiving unit 460 includes a second receiving body 462, a fourth gate 464, a fifth gate 466 and a sixth gate 468.

The second receiving unit 460 also includes a plurality of slots (not shown) so as to pile a plurality of the first and second substrates 15 and 17.

The fourth gate 464 is disposed in the second receiving body 462, and faces the main transportation unit 400 so as to pile the second substrate 17 transported form the main transportation unit 400 in the slots of the second receiving body 462. The fifth gate 466 is disposed in the second receiving body 462, and faces the liquid crystal alignment unit 300 so as to pile the first substrate 15 outputted from the liquid crystal alignment unit 300 in the slots of the receiving body 462. The sixth gate 468 is disposed in the second receiving body 462, and faces the second unit 200 so as to provide the first and second substrates 15 and 17 that are piled in the second receiving body 462 to the second unit 200.

Figure 9:
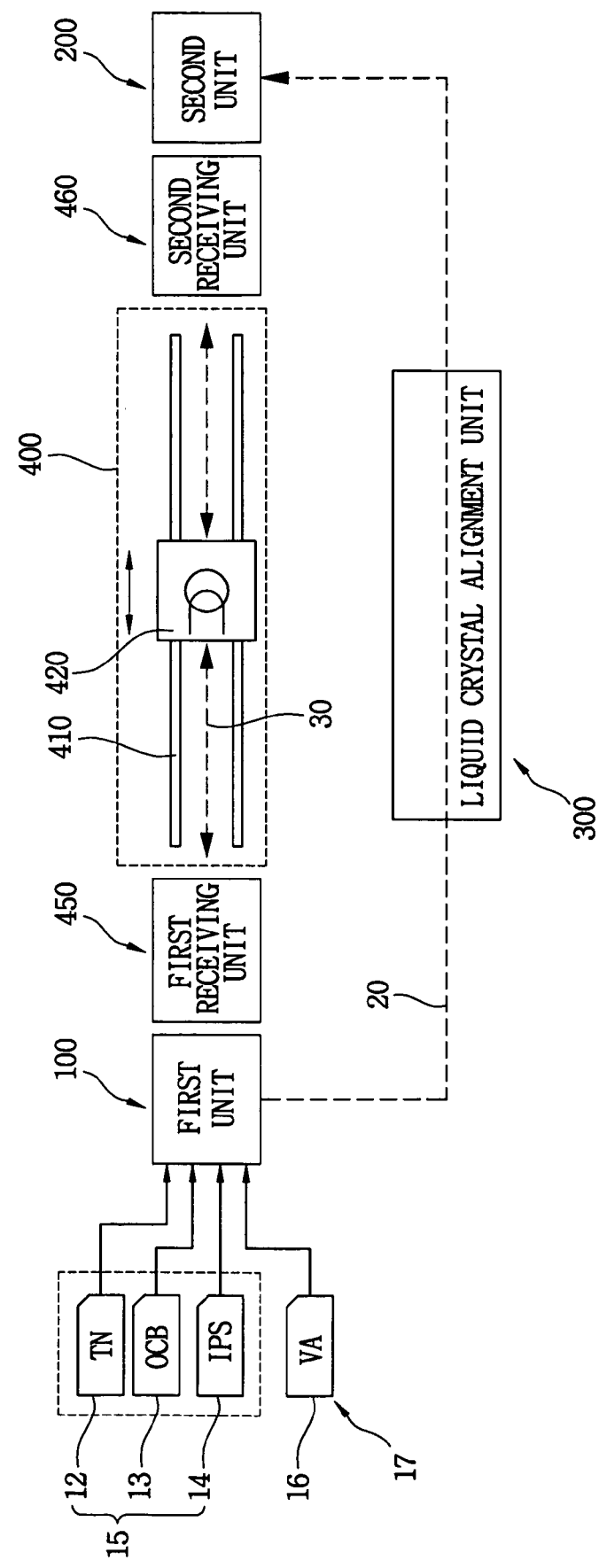
FIG. 9 is a schematic view showing a main transportation unit of FIG. 8.

FIG. 9 is a schematic view showing the main transportation unit of FIG. 8.

Referring to FIG. 9, the main transportation unit 400 transports the second substrate 17 from the first receiving unit 450 to the second receiving unit 460 through a second route 30. The second route 30 is a straight-line route, and it is shorter than the first route 20. The second route 30, for example, connects the first and second units 100 and 200 with a straight line. The first route 20 connects the first and second units 100 and 200 with a curved line.

Hence, the main transportation unit 400 is disposed between the first and second receiving units 450 and 460. The main transportation unit 400 transports the second substrate 17 from the first receiving unit 450 to the second receiving unit 460 through the second route 30 that does not pass through the liquid crystal alignment unit 300.

The main transportation unit 400 includes a guide rail 410 and a transportation robot 420 so as to greatly decrease the time for transporting the second substrate 17 from the first receiving unit 450 to the second receiving unit 460.

The guide rail 410 is installed between the first and second receiving units 450 and 460. The guide rail 410 may be installed as a single line or a multiple line. In this exemplary embodiment, the guide rail 410 is installed as a multiple line, and the guide rail 410 may form part of a curved line.

The transportation robot 420 transports the second substrate 17 from the first receiving unit 450 to the second receiving unit 460 along the guide rail 410. The transportation robot 420 may transport the second substrate 17 from the first receiving unit 450 to the second receiving unit 460, or vice versa. In this exemplary embodiment, the transportation robot 420 transports a single second substrate 17 from the first unit 100 to the second unit 200.

Figure 10:
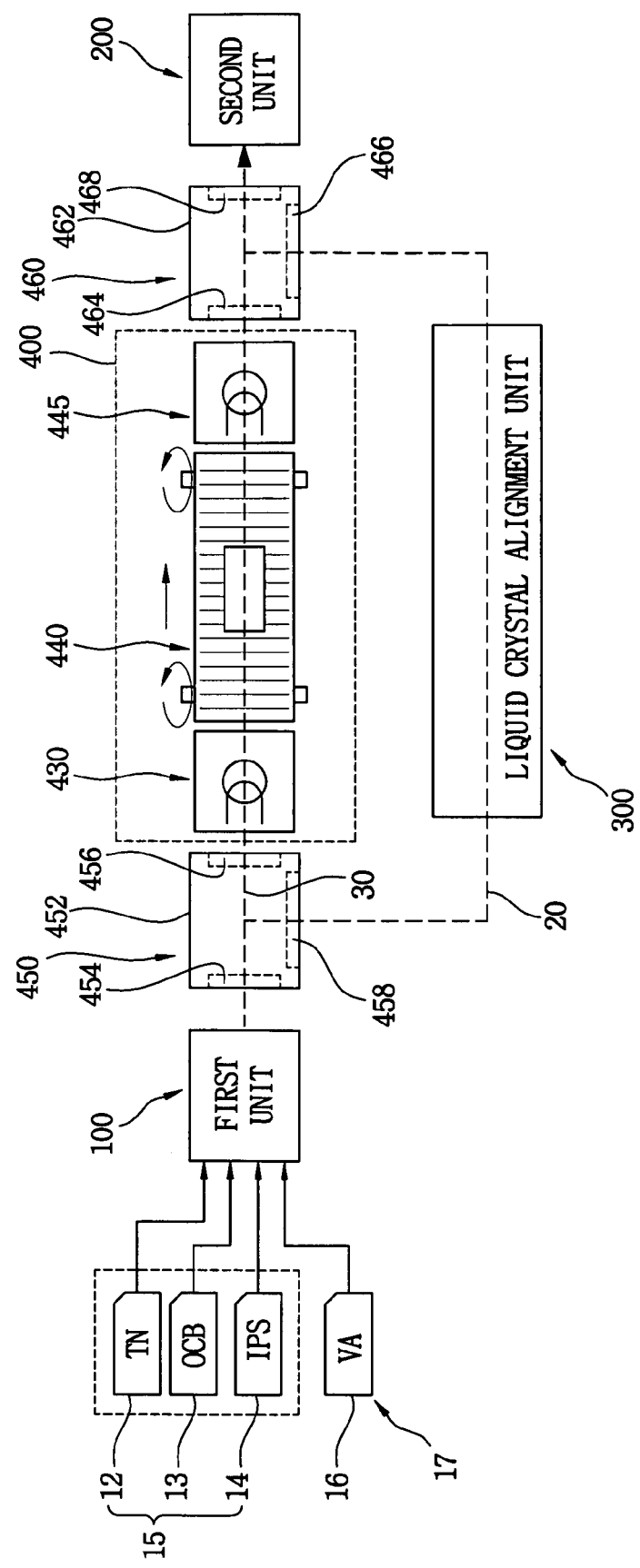
FIG. 10 is a schematic view showing a main transportation unit of FIG. 8 according to another exemplary embodiment of the present invention.

FIG. 10 is a schematic view showing a main transportation unit according to another exemplary embodiment of the present invention.

Referring to FIG. 10, the main transportation unit 400 includes a first robot arm 430, a second robot arm 445 and a conveyer transportation unit 440.

The conveyer transportation unit 440 is disposed between a first receiving unit 450 and a second receiving unit 460. The conveyer transportation unit 440 transports the second substrate 17 from the first receiving unit 450 to the second receiving unit 460 or vice versa. In this exemplary embodiment, the conveyer transportation unit 440 transports the second substrate 17 from the first receiving unit 450 to the second receiving unit 460.

The first robot arm 430 is disposed between the conveyer transportation unit 440 and the first receiving unit 450, and transports the second substrate 17 from the first receiving unit 450 to the conveyer transportation unit 440.

The second robot arm 445 is disposed between the conveyer transportation unit 440 and the second receiving unit 460, and transports the second substrate 17 from the conveyer transportation unit 440 to the second receiving unit 460.

Since the conveyer transportation unit 440 may successively transport the second substrate 17 in one direction from the first receiving unit 450 to the second receiving unit 460, the time for transporting the second substrate 17 may be shortened compared to the transportation time when the AGV or the guide rail is used. The conveyer transportation unit 440 also safely transports the second substrate 17 even when the surface area of the second substrate 17 is augmented.

According to various exemplary embodiments of the invention, an alignment layer is commonly formed on first and second substrates. Transporting routes of the first and second substrates are divided so as to form the liquid crystal alignment part only on one of the first and second substrates. A transportation robot transports the first substrate without the liquid crystal alignment part formed thereon with a high speed so as to shorten the transporting time and decrease the area occupied by the equipment.

Although the exemplary embodiments of the present invention have been described, it is understood that the present invention should not be limited to these exemplary embodiments but various changes and modifications can be made by one of ordinary skilled in the art within the spirit and scope of the present invention as hereinafter claimed.

What is claimed is:

1. An equipment for aligning liquid crystals, comprising:
   a first unit to form a first alignment layer and a second alignment layer on a first substrate group and a second substrate group, respectively;
   a second unit spaced apart from the first unit so as to receive the first and second substrate groups passed through the first unit;
   an alignment unit disposed between the first and second units, the alignment unit to provide a liquid crystal alignment part over the first alignment layer of the first substrate group while the first substrate group is transported through a first path from the first unit to the second unit, the liquid crystal alignment part aligning the liquid crystals on the first alignment layer; and
   a transportation unit disposed between the first and second units, the transportation unit to transport the second substrate group through a second path from the first unit to the second unit.

2. The equipment of claim 1, wherein the transportation unit further comprises:
   a guide rail to connect the first unit to the second unit; and
   a transportation robot mounted on the guide rail so as to transport the first substrate group.

3. The equipment of claim 1, wherein the transportation unit is a conveyor unit disposed between the first and second units.

4. The equipment of claim 3, wherein the transportation unit further comprises:
   a first robot arm to transport the first substrate group to the conveyor unit from the first unit; and
   a second robot arm to transport the first substrate group to the second unit from the conveyor unit.

5. The equipment of claim 1, wherein the first path is a straight-line path.

6. The equipment of claim 5, wherein the first path is longer than the second path.

7. The equipment of claim 1, wherein the second path is a straight-line path.

8. The equipment of claim 7, wherein the second path is longer than the first path.

9. The equipment of claim 1, wherein the alignment unit comprises:
   a rubbing roller to which a rubbing cloth having a pile is attached; and
   a rubbing roller transporting device to transport the rubbing roller.

10. The equipment of claim 1, wherein the alignment unit comprises:
    a cleaning module to clean the first substrate group; and
    a substrate aligning unit to adjust a direction of the liquid crystal alignment part.

11. The equipment of claim 1, wherein the second unit is one of a substrate cassette that receives the first and second substrate groups and a rinsing device that rinses the first substrate group and/or the second substrate group.

12. An equipment for aligning liquid crystals, comprising:
    a first unit to form a first alignment layer and a second alignment layer on a first substrate group and a second substrate group, respectively;
    a first receiving unit to receive the first and second substrate groups from the first unit, and to temporarily store the first and second substrate groups;
    a transportation unit to transport the first substrate group through a first path from the first receiving unit;
    a liquid crystal alignment unit to transport the second substrate group along a second path from the first receiving unit and to provide a liquid crystal alignment part over the second alignment layer, the liquid crystal alignment part aligning the liquid crystals on the first alignment layer; and a second receiving unit spaced apart from the first receiving unit so as to receive the first and second substrate groups from the transportation unit and the liquid crystal alignment unit, respectively, and to temporarily store the first and second substrate groups.

13. The equipment of claim 12, wherein the transportation unit comprises:

a guide rail to connect the first receiving unit to the second receiving unit; and a transportation robot mounted on the guide rail to transport the first substrate group.

14. The equipment of claim 12, wherein the transportation unit further comprises a conveyor unit disposed between the first and second receiving units.

15. The equipment of claim 14, wherein the transportation unit further comprises:

a first robot arm to transport the first substrate group to the conveyor unit from the first unit; and a second robot arm to transport the first substrate group to the second receiving unit from the conveyor unit.

16. The equipment of claim 12, wherein the first receiving unit further comprises:

a first gate through which the first substrate group is loaded;

a second gate through which the first substrate group is unloaded to the transportation unit; and a third gate through which the second substrate group is unloaded to the liquid crystal alignment unit.

17. The equipment of claim 12, wherein the second receiving unit further comprises:

a fourth gate through which the first substrate group from the transportation unit is loaded;

a fifth gate through which the second substrate group from the liquid crystal alignment unit is loaded; and a sixth gate through which the first and second substrate groups are unloaded.

18. The equipment of claim 12, wherein the first path is a straight-line path.

19. The equipment of claim 12, wherein the first path is shorter than the second path.

20. The equipment of claim 12, wherein the liquid crystal alignment unit further comprises:

a first cleaning module to initially clean the second substrate group; and a second cleaning module to clean the second substrate group over which the liquid crystal alignment part is provided.

* * * * *